UNITED STATES PATENT OFFICE.

CARL LUDWIG MÜLLER, OF LUDWIGSHAFEN-ON-THE-RHINE, BAVARIA, GERMANY, ASSIGNOR TO THE BADISCHE ANILIN AND SODA FABRIK, OF MANNHEIM, GERMANY.

MANUFACTURE OF SULPHONATED PURPLE DYE-STUFFS FROM BASIC ROSANILINE.

SPECIFICATION forming part of Letters Patent No. 353,266, dated November 23, 1886.

Application filed September 25, 1886. Serial No. 214,549. (Specimens.)

*To all whom it may concern:*

Be it known that I, CARL LUDWIG MÜLLER, a subject of the King of Bavaria, residing at Ludwigshafen-on-the-Rhine, in the Kingdom of Bavaria and Empire of Germany, have invented new and useful Improvements in the Manufacture of a Sulphonated Purple Dye-Stuff or Coloring-Matter from the Basic Rosaniline Derivative Resulting from the Condensation of Diethylamidobenzoic Acid with Methyldiphenylamine, of which the following is a specification.

This invention relates to the manufacture of a sulphonated purple dye-stuff or coloring-matter from the basic rosaniline derivative resulting from the condensation of diethylamidobenzoic acid with methyldiphenylamine.

In carrying out my invention, I take about five parts, by weight, of diethylamidobenzoic acid, and mix the same intimately with nine parts, by weight, of methyldiphenylamine. I then quickly add eight parts, by weight, of oxychloride of phosphorus. The mixture thus produced is then heated under constant agitation until its inside temperature has reached about 100° centigrade, at which temperature it is to be kept during the space of about from six to eight hours. The bronze-colored "melt" thus obtained is digested with boiling water. The resulting acid solution, after being allowed to cool down and to settle, is then separated from the undissolved residue by decantation. The said undissolved residue is afterward exhausted with boiling water. The dark purple solution thus obtained is filtered and precipitated with common salt. The resulting precipitate is washed and dried.

In order to convert the basic rosaniline derivative thus produced (and which, according to its chemical composition, may be called a "dimethyl-diethyl-diphenyl-pararosaniline") into my new sulphonated coloring-matter possessing acid properties, and therefore capable of dyeing in an acid bath, the known methods of sulphonization may be employed. Practical results are obtained by treating said basic coloring-matter with fuming sulphuric acid at a temperature requiring to be regulated according to the strength of the sulphuric acid employed. The action of rectified sulphuric acid produces inferior results, on account of its requiring the assistance of a temperature exceeding 100° centigrade, and thus liable of injuring the coloring-matter, while fuming sulphuric acid effects the desired sulphonization at a considerably lower temperature, and even without any external application of heat.

As an example I proceed as follows: About one part, by weight, of the basic rosaniline derivative (produced, as before described, by the condensation of diethylamidobenzoic acid with methyldiphenylamine) is added in the state of a dry powder in the cold, and in very small portions at a time, to about five parts, by weight, of fuming sulphuric acid containing about twenty-three per centum of free sulphuric anhydride. The acid mixture is externally surrounded with ice, and care is taken to prevent any rise of its temperature beyond 10° centigrade. The solution thus obtained, after being first allowed to stand at a temperature of about from 10° to 15° centigrade during the space of about twelve hours, is afterward carefully diluted with about twenty times its own volume of ice-cold water. The precipitate of the free sulpho-acid thus produced is then dissolved with a slight excess of caustic-soda liquor, and the alkaline solution, after being filtered and carefully neutralized with muriatic acid, is precipitated with common salt. The precipitate thus obtained is then pressed and dried.

The sulphonated dye-stuff or coloring-matter produced in the usual form of a sodium salt, as before described, presents the following characteristics: It has the appearance of a dark-blue powder possessing a bronze-like luster, soluble in water, with a bright bluish-purple color. By the addition of caustic alkalies the said purple color of the aqueous solution becomes gradually destroyed, but is restored upon neutralizing the free alkali with a mineral or organic acid. Rectified sulphuric acid dissolves the dye-stuff with a yellow-red color, which, upon addition of water, turns green. By submitting an intimate mixture of the dye-stuff with caustic lime to destructive distillation a basic oil distills over possessing a characteristic disagreeable smell, and partly insoluble in dilute hydrochloric acid, the insoluble portion of the same developing a blue color in the presence of nitric acid.

The new dye-stuff, if employed in the processes of dyeing and printing in a similar manner as the hitherto known sulphonated coloring-matter, is capable of imparting to animal fiber a bright bluish-purple color resisting the action of acids.

What I claim as new, and desire to secure by Letters Patent, is—

As a new product, the purple dye-stuff or coloring-matter which, when employed in the process of dyeing and printing in a similar manner as the hitherto-known sulphonated coloring-matter, is capable of imparting to animal fiber a bright bluish-purple color resisting the action of acids, and which is dissolved by rectified sulphuric acid with a yellow-red color, which, upon addition of water, turns green, substantially as described.

In testimony whereof I have hereunto set my hand in the presence of two subscribing witnesses.

CARL LUDWIG MÜLLER.

Witnesses:
J. F. MONAGHAN,
HENRY SCHAEPPI.